July 16, 1968

E. L. McINTYRE, JR 3,393,131

SALINE WATER CONVERSION APPARATUS

Filed May 1, 1967

INVENTOR.
E. LOWE McINTYRE JR.

BY Philip D. Golrick

ATTORNEY

July 16, 1968  E. L. McINTYRE, JR  3,393,131

SALINE WATER CONVERSION APPARATUS

Filed May 1, 1967  4 Sheets-Sheet 4

INVENTOR.
E. LOWE McINTYRE JR.
BY
Ely & Golrick
ATTORNEYS 3,393,131
Patented July 16, 1968

3,393,131
SALINE WATER CONVERSION APPARATUS
E. Lowe McIntyre, Jr., 1567 Overlook Road,
Kent, Ohio 44240
Continuation-in-part of application Ser. No. 346,148,
Feb. 20, 1964. This application May 1, 1967, Ser.
No. 641,097
11 Claims. (Cl. 202—187)

ABSTRACT OF THE DISCLOSURE

A watercraft engine waste heat operated salt water distillation system including a unit comprising a cylindrical tank, an inner, open-ended cylinder spaced from the tank side, top and bottom walls; a pair of further inner, concentric, nested cylindrical, upright cups with a vapor condenser between the cup side walls, the outer cup collecting condensate; a blower superimposed above a central aperture in the inner cup bottom, a feed spray nozzle for admission of heated feed water through the tank bottom; a concentrate outlet in the tank bottom and a pair of annular mist eliminators upstream and downstream of the condenser all arranged to provide an air-vapor closed cycle path from the spray chamber in the tank bottom through the first eliminator, condenser second eliminator, blower, outermost annular passage and back through the spray chamber.

---

This is a continuation in part of Ser. 346,148 filed Feb. 20, 1964.

The present invention relates to apparatus and method for conversion of sea water or the like into fresh water especially in watercraft by utilizing engine waste heat in a novel process.

For converting brackish or saline, especially sea waters, into water reduced in mineral content, many methods and apparatus are already known, some using waste heat as a principal energy source for an evaporative or quasi-evaporative operation.

Although elsewhere useful, the invention will be described as applied to salt water conversion as in smaller, internal combustion engine powered watercraft where particularly advantageous.

Waste engine heat is absorbed in the process feed water, for example, salt water used as the engine coolant; such heated water and a circulating air stream are brought into intimate contact; and the moisture laden air stream is passed over a cooling surface to condense out water vapor as fresh water with return of the thus partially dried air for again contacting the hot feed. Ambient sea water cools a condenser in the unit. Mass transfer contact is obtained by bubbling the air through a body of the hot water and thereafter passing it through a spray of feed water being added to the said body of water.

The continuously circulated air, the transport medium for water vapor, apart from adventitious undesired leakage, is not discharged from the system. Hence in a steady state operation, there are avoided the losses entailed by prior processes where ambient atmospheric air is brought into contact with heated salt water, and than discharged from a condenser to the free atmosphere with a continuing loss both of heat and of part of the evaporated moisture content.

The described apparatus is a compact canister unit suitable for smaller watercraft where space is generally at a premium, and further is simple in functional parts, and easy to maintain and install, requiring connection to environmental structure or facilities only of its motor leads and only six liquid conduits.

It is the general object to provide a method and apparatus for converting sea, brackish or saline water into useable fresh water by utilization of waste heat. Another object is the provision of such method and apparatus readily applicable in smaller internal combustion engine powered seagoing watercraft utilizing engine waste heat as a primary source for evaporation energy, with the apparatus compact and relatively simple in structure, operation and installation, and operating by what might be called in broad sense an air distillation process conjoined with a spray evaporation process, in which an air stream as a water vapor transfer or carrier medium is continually recirculated in the system. Other objects and advantages will appear from the following description and the drawings wherein:

Figure 1:
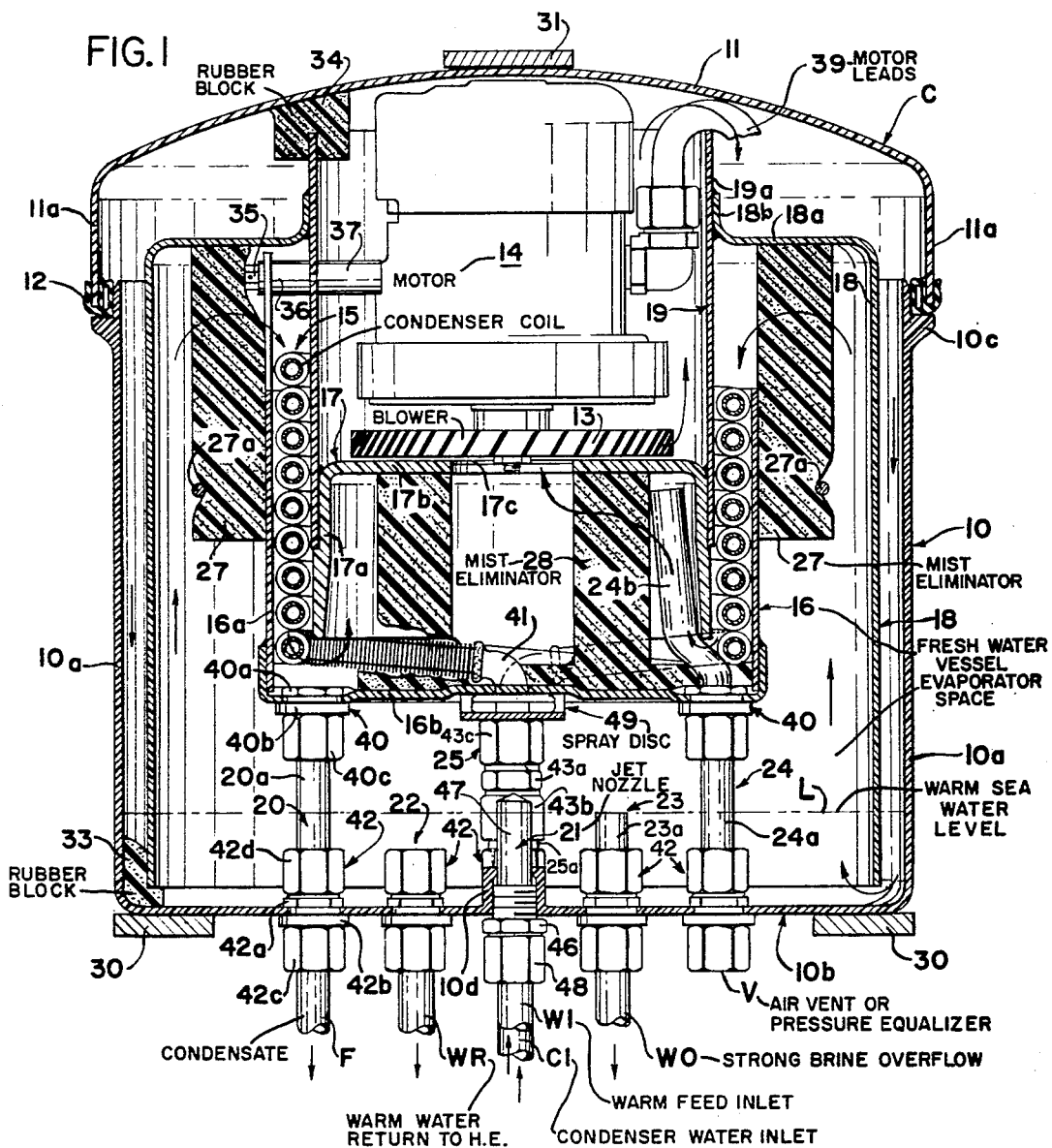
FIG. 1 is a vertical longitudinal somewhat irregular sectional view of a unit in accordance with this invention.
Figure 2:
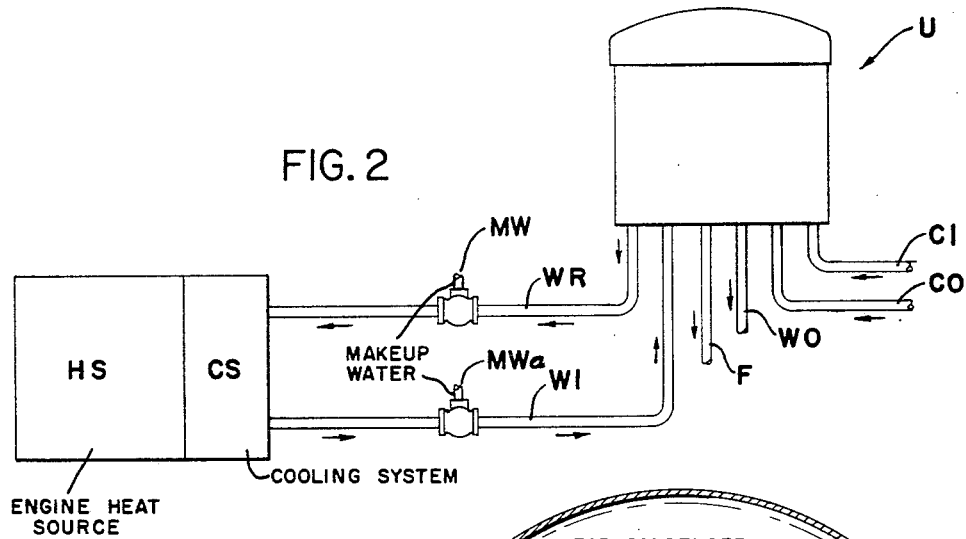
FIG. 2 is a schematic diagram of connections between the unit of FIG. 1 and one typical environment of use.

In the drawings, FIG. 1 shows a converter unit utilizable in the environment represented by the schematic diagram of FIG. 2 for carrying out the conversion of sea water into fresh water in a watercraft having an engine as a heat source providing thermal energy for an evaporation process.

Figure 3:
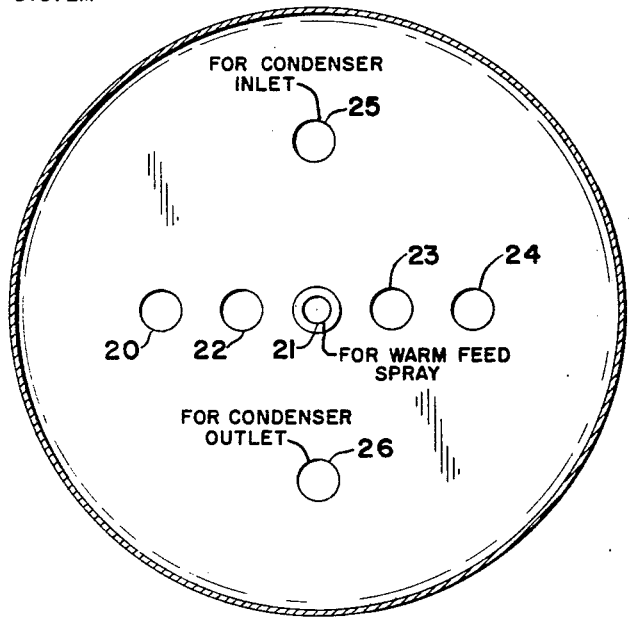
FIG. 3 is a schematic plan of the locations of various water connections to the unit of FIG. 1.

The unit includes as primary components, an external housing or canister C with a cylindrically-walled, flat-bottomed body 10 and cover 11 sealed by gasket 12 to the atmosphere except for described venting; a turbine type blower wheel 13 continuously driveable by electric motor 14; a preferably metallic condenser tube coil 15; a cylindrically-walled fresh water receptacle 16 for condensate from coil 15; coaxially arranged partition means dividing the canister interior into evaporation and condenser chamber spaces, and including the external cylindrical partition 18 joined through its integral inward top flange 18a to the upper part of interior partition 19, the latter supporting near its bottom end an inverted bowl-shaped element 17; conduit means (see also FIG. 3) connected to or extending through the bottom of the canister (by general reference numerals designated as fresh water outlet 20, warm feed water inlet 21, warm water return outlet 22, warm water waste overflow 23, air vent 24, condenser cooling water inlet 25 and condenser water outlet 26); and also air permeable spray catcher or mist eliminator elements 27 and 28, for retention of entrained salt water and fresh water droplets respectively.

Preferably the components are formed of corrosion resistant materials; with various synthetic plastics suitable especially by their low heat conductivity as compared with most metals. Thus the canister body and top 10, 11, the partitions 17, 18, 19, and receptacle 16, may be formed of a glass fiber reinforced polyester; the filter-like elements 27, 28 of an open cell polyurethane foam; and tubing fittings in greater part of plastics.

The top 11 is held gasket-sealed on the body by any suitable means, such for example, as bottom-and top-engaging mounting bracket structures 30, 31.

The inner periphery of the radial wall 18a is cylindrically flanged upwardly at 18b to be rigidly cemented to an upper inner partition portion 19a with circumferentially spaced rubber or elastomeric blocks 33 interposed radially and endwise between the bottom margin of partition 18 and the cylindrical and bottom walls 10a, 10b, and with a second set of circumferentially spaced blocks 34 between the top 11 and the upper edge of the extension 19a, the two sets being under compression or working against each other when the cover is in place, the partitions are firmly supported coaxially within the canister and, therewith, the other components hereinafter described.

The motor unit 14 is mounted with shaft vertical by radial bolts 35, through extensions of the cylindircal wall 16a, spacer sleeve 36, inner partition 19, and spacer 37, threaded into the motor casing to maintain the fan, motor and receptacle 16 coaxial with partition 19. Waterproofed motor leads 39 are brought out sealed through the canister. Preferably the motor unit either has a sealed vapor-proofed interiorly ventilated casing or has its internal parts water-proofed against moisture-laden cooling air therethrough.

The inverted cup-shaped member 17 provides both skirt 17a as a downward continuation of the wall 19, and also across 19 a transverse partition 17b in close running clearance to the blower wheel 13, but centrally apertured at 17c as an inlet passage into the central fan intake.

The coil 15 is thus disposed in an annular passageway condenser space formed between the external cylindrical wall 16a and 19–17a as an inner wall. Coil 15, preferably integrally finned copper, is so double wound that the free ends are disposed diametrically on the coil bottom (FIG. 3 locations 25, 26) as at the right angle bend 41 to go through the receiver bottom wall 16b. With bottom wall 16b metal, the coil ends may be braze-sealed therethrough; or may either be cemented to, or by fittings carried through, the bottom wall 16b, especially if the latter is plastic.

On respective diameters at 90° to each other, the coil ends to conduits 25, 26, and conduits for the discharge outlet 20 and air vent 24 are secured to the receptacle by fittings 40 located in a depressed margin or shallow trough region of wall 16b providing a condensate flow path toward outlet 20.

Figure 4:
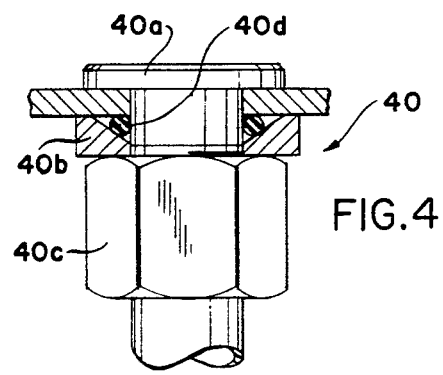
FIG. 4 is a detail of a wall lead-through conduit fitting.

Each fitting 40 includes a flanged threaded sleeve 40a (see FIG. 4) through and secured to the wall 16b by nut 40c and washer 40b having an upwardly disposed conical seat compressing a sealing O-ring 40d against sleeve 40a and wall. The tubing 20 from its fitting 40 is carried through the canister bottom 10b by a lead-through fitting 42, sealed to the wall 10b in a manner similar to the sealing of fittings 40. A sealant may additionally be applied to ensure air-tight seals to the walls. The nut 40c may secure the upper end of conduit section 20a to sleeve 40 by compressing a gasket thereabout or other means; while one or both nuts 42c or 42d may similarly obtain a compression seal on 20c where it is carried through as an integral part becoming the external line F.

To ensure free drainage of the product water, in the vent arrangement 24, similar to that at 20, at the top connection through the wall 16b, a short curved vent tube 24b terminating in the upper dome-like space defined by the member 17 continues as tube 24a to open through the bottom fitting 42 to the external atmosphere.

Similarly for the warm water discharge return line WR a fitting assembly 42 merely opens to the canister interior space; the fitting 42 for the warm water overflow line WO however, carrying a short projection 23a of height selected so that the water level in the canister normally lies between the outlet fitting at 22 and the top of the exension 23a; the level L determined by 23. In any event, the operational level is to be maintained above the bottom edge of the inner partition wall 18. Aboard watercraft with pitching and rolling, with the geometry shown so selected that with say a 10° tilt of the unit a water seal is maintained around the bottom of partition 18, even up to 30° rolling fresh water will be produced at a useful though reduced rate.

For the cooling water connections 25 and 26 a similar fitting 42 is used with a short extension 25a connected to the corresponding coil end 41 by a coupling 43.

A central inward canister boss 10d is counterbored and bottom threaded for a male coupling 46 interiorly bearing a jet nozzle 47 and externally connected to a warm water supply line WI by a coupling nut 48; the nozzle jet aimed against spray dispersing disk 49.

With warm salt water supplied through line WI to the jet 47, cooling water to the condenser line CI and discharging through line CO, and the motor operating, the following action occurs.

Incoming warm salt water, dispersed as a spray through the space below the fresh water receptacle, after a short period forms a warm water body up to level L. As air is circulated by fan 13, moist air being drawn from the evaporation space (defined between the water-covered canister bottom, wall 18 and the fresh water receptacle), successively through mist eliminator 27, the apertured top of wall 16a, down the coil-occupied condensing space, mist eliminator 28 and the fan inlet opening 17c to the circulating blower 13. The blower discharges air into the fan discharge chamber (defined by cover 11, wall 19 above the wall 17b), over wall extension 19a, to the manifold-like space (between 11, 18 and 19a) whence it discharges longitudinally downward through the perimetric or circumferential annular passage between walls 18a and 10a, and under the bottom edge of the wall 18 to bubble up through the water back into the evaporation space.

In this movement, air depresses the water between 10a and 18a toward the bottom edge of 18a and bubbles under the edge at randomly changing points under dynamic conditions to pass up through the full height of the warm water body picking up water vapor by the so-called air distillation operation. As the humidified air passes through the evaporation space meeting warm inlet spray, evaporation from the spray droplets is aided by both the relatively higher inlet water temperature; therefore higher water vapor pressure, and as well the high spray area so generated. The moist air stream is effectively cooled by the high heat transfer area of coil 15, and moisture condensing therefrom on the coil flows to the fresh water receptacle for discharge at the fresh water line F.

It has been found with an open-cell polyurethane foam 1½ inch thick, having a porosity such that 97% of the volume is air space, under operating conditions hereinafter stated, that water rapidly flows toward the bottom of the element 27, into the region below that through which the air passes, so that the active air flow space through the element does not load up with water. An annulus of foam 27 may be clamped in place on 19a by a light springy ring 27a and top-cemented to 18a. In the similar hollow cylindrical plastic filter material 28, interposed endwise between the transverse walls 16b, 17b, any fresh water droplets are removed from the air stream leaving the tortuous path through the condenser space, and the trapped water flows downward in the filter to the bottom of the receptacle to reach outlet 20. Since the water flows readily through a suitable foam, a flange-like pad of the same about the bottom of cylinder 28 may be used to keep the latter centered during assembly, and further to provide in effect a conduit for product flow to outlet line 20 despite high air flow around the edge of 17a.

In the schematic diagram, FIG. 2, the unit U is in a small boat environment with the boat engine the source HS of waste heat used for the evaporative and conversion process. Here a heat exchanger CS between the heat source and a circulating warm water stream is provided either by a liquid-liquid heat exchanger between the engine coolant stream and a separate salt water stream to be heated, or by the engine cooling system through which sea water, passed as an engine coolant, picks up heat (and thereby is heated above the temperature of water taken from the sea for cooling water delivered at CI and discharged back into the sea at CO) before delivery through the line WI for injection into the unit at the warm water inlet 21. The heat exchanger CS, however, could comprise a tubing coil located in the bottom of the unit through which engine coolant is passed to heat the retained water body.

In FIG. 2, a substantially closed circulating system is provided by returning water from the sump part or evaporating space of the unit through the line WR to the heat exchanger or cooling system. The sea water delivered to the condenser may be supplied by any suitable means such as a rotary or piston pump, or a "scoop" or impact hydraulic unit operating by the motion of the craft through the water.

Make-up sea water is added to the system (where a "closed" circulation of warm salt water is used) at the point MW into the return line WR, or alternatively to line WI at MWa. Preferably the make-up at rate exceeds the fresh water production the excess discharging from the unit U through the overflow line WO, thereby to prevent a salt build-up within the system, and also avoiding a depressant effect on the water vapor pressure.

Of course depending upon the engine size and the size of the unit, only a part of a total salt water coolant volume for a given engine may be required to be by-passed to the unit U. Also with certain types of cooling systems the warm water return line WR may not be used or needed, where, for example, a continued high volume of heated salt water is delivered from the engine and discharged through WO to the sea.

As well as ensuring free fresh water drainage, the vent or vent line 24 serves to maintain the average pressure within the vessel (apart from local differences on opposite sides of the wall 17b) generally at prevailing atmospheric pressure to avoid unnecesary stresses on the gasket or cannister such as might arise if the unit were completely closed to the atmosphere, either in consequence of a build-up of dissolved and entrained gases brought in with the warm water at WI, or in consequence of heating and cooling of the system and the gases therein contained between the times when the unit is in and out of use.

The closed air circulation generally is preferable and has distinct advantage over merely taking in ambient atmospheric air and then after one pass as a mass transfer medium, exhausting it to the atmosphere; for the latter procedure usually involves a loss of water vapor corresponding to the difference in the vapor pressure or saturated air leaving the condenser and of unsaturated air taken in from the atmosphere, and also heat waste in a similar manner.

As an example of the operation with a simulated brackish type feed water, a unit having the geometry and proportions of that shown in FIG. 1 for a canister diameter of about 16 inches and an operating water level L of about 2 inches tested as follows:

Warm water was delivered at a rate of 3.3 gallons per minute with an average temperature of about 153° F. under 20 p.s.i. pressure through a jet nozzle 47 with an orifice about 0.16 inch in diameter. Condenser water was supplied at about 5 gallons per minute and 55° F. The interior air body was circulated by a single stage blower 13 at an estimated 78 cubic feet per minute, the motor operating at about 200 watts input. Fresh water was produced at the rate of 4.03 gallons per hour. With the warm water delivered to inlet 21 at 12 p.s.i. and about 2.6 gallons per minute, and about 80 watts input for air circulation at about 64 c.f.m., fresh water was produced at the rate of about 2.62 gallons per hour.

Figure 5:
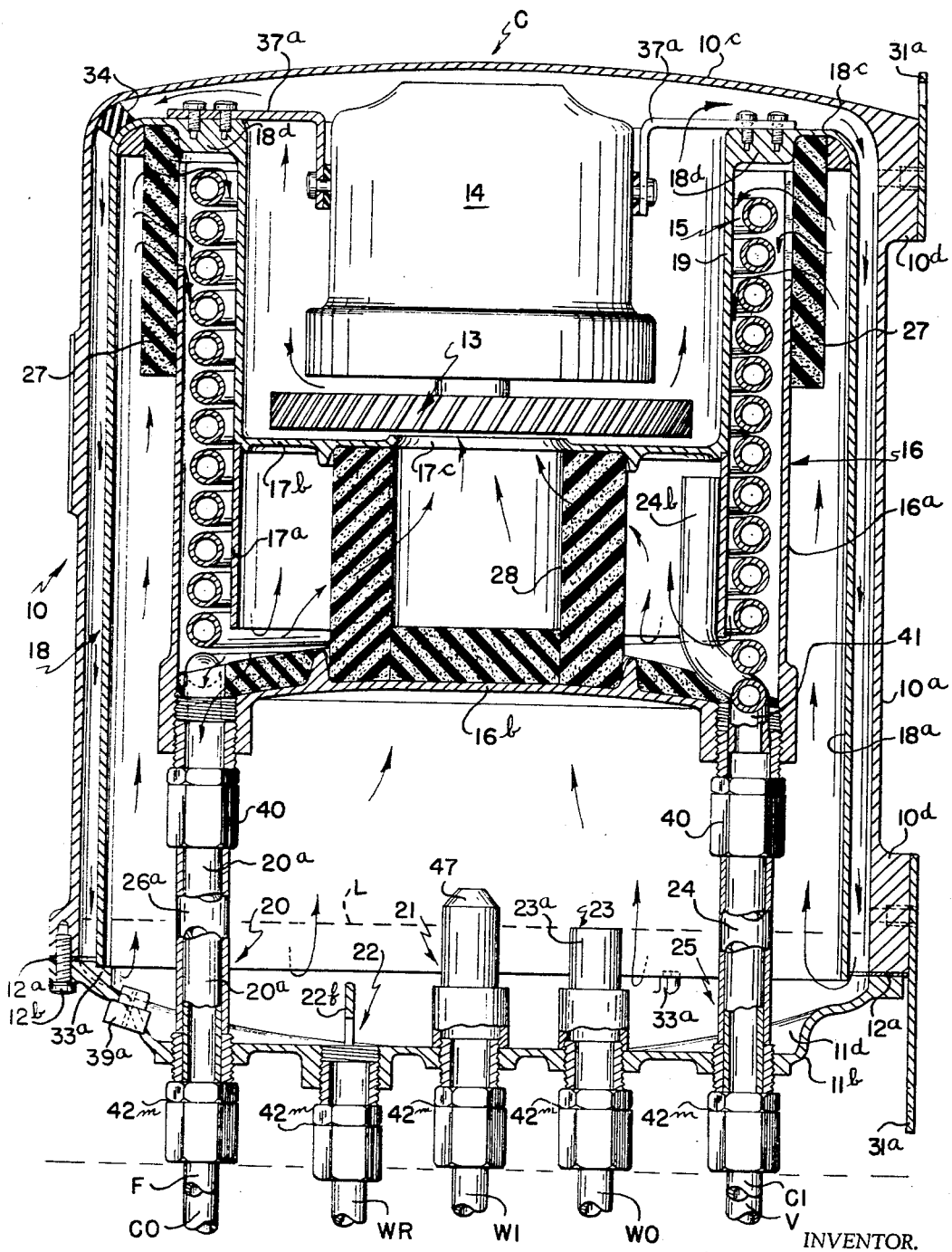
FIG. 5 is a modification in a view like FIG. 1.

In FIG. 5, wtih parts analogous to those of FIG. 1 designated by similar numerals, the above described unit U is modified for convenience in assembly, primarily by providing the cylindrical side wall 10a and top wall 10c in an integral bell-like member circumferentially sealed with an interposed gasket 12a by securing bolts 12b at its bottom edge to the rim of the upwardly concave bottom lid or cover disc member 11b, on which all other components are assembled; the unit being mounted by brackets 31a secure to integral bosses 10d on the cylindrical wall.

Figure 6:
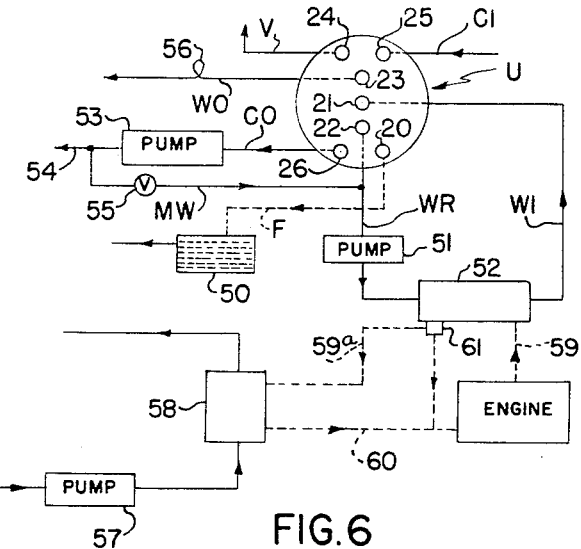
FIG. 6 is a diagram of piping to ancillary components.

The vent and various liquid conduit connections are brought through downward, threaded apertured nipple bosses located as indicated schematically at U in FIG. 6 in a flat-bottomed diametric trough 11d in the bottom wall; an anti-vortex baffle 22f spanning the opening for warm salt water return 22; while motor leads (not shown) pass through a fluid tight electrical cable leadthrough fitting 39a. Also a plurality, at least three, of integral vertically and horizontally shouldered locating bosses 33a support the bottom edge of partition 18a spaced from the lid and in coaxial relation to housing wall 10 to form the inward air passage.

Centrally apertured transverse partition 17b and cylindrical partition 19 joined concentrically by a top wall 18c to cylindrical partition 18a are here cast or molded as one piece 18 supporting the principal internal components and having integral locating, mounting, or bolt receiving formations for the separator mist eliminator 28, for dependent skirt 16a, and for brackets or straps 37a of the motor-fan sub-assembly.

The cylindrical wall 16a and upwardly concave bottom wall 16b of an integral member again provide the fresh water receptacle; the bottom 16b serving as a dispersing plate for a sea water jet at 47; and 16a with the inwardly coaxial wall formed by 19 and skirt 16a defines a condenser space or chamber for coil 15; and the evaporation space is again defined by 18a, 16b and 11b.

The primary internal components are thus supported by the described integral element 18 resiliently held between the dome of the bell, where it is spaced by rubber elastomeric blocks 34, and the integral bosses 33a on the lid 11b.

The inner male ends of tubing couplings 42m are threaded through lid bosses, respectively at 22 open to the evaporator space; at 21 and 23 connected to jet 47 and overflow level pipe 23a; and at 25, 26, 24 and 20 having joined thereto tubing lengths, each surrounded with a spacer sleeve and either connected, by similar coupling fittings 40 threaded into integral bosses on 16b, to the condenser coil ends and to the vent, or merely opening to 16 as a fresh water outlet.

FIG. 6 shows a variation in the piping connections for the overall system with fresh water lines dashed and sea water lines solid, including an external fresh water tank 50 terminating F; a hot water return pump 51 circulating water through heat exchanger 52 back to the unit inlet; a suction pump 53 in the condenser water overboard discharge line CO drawing cooling water from CI as a sea water ambient intake through coil 15 for overboard discharge through 54 with a valve 55 on the discharge side metering make-up water, warmed by passage through the condenser, through the line MW to line WR into pump 55; an airlock loop or trap 56 being provided in the overflow line WO.

A common type of engine cooling system is shown, where ambient sea water, delivered by pump 57 through engine heat exchanger 58 back to the sea, cools the engine coolant, usually fresh water, circulated through lines 59, 59a and 60 between the heat exchanger 58 and the engine. Here the heat exchanger 52 is inserted in the line 59, 59a from engine to engine heat exchanger 58;

and the coolant from heat exchanger 52 passes through the normally open passage of a thermostatically controlled diverter valve 61 directly back to engine coolant return line 60, by-passing engine heat exchanger 58; except that when the converter unit U is not removing enough heat from the coolant, the valve 61 thermostatically begins to open to its normally closed passage, to deliver part of the engine coolant also to engine heat exchanger 58, the temperature at which this action occurs being set (or valve selection made) according to the engine requirement, a temperature of 190° F. being selected in some cases.

Figure 7:
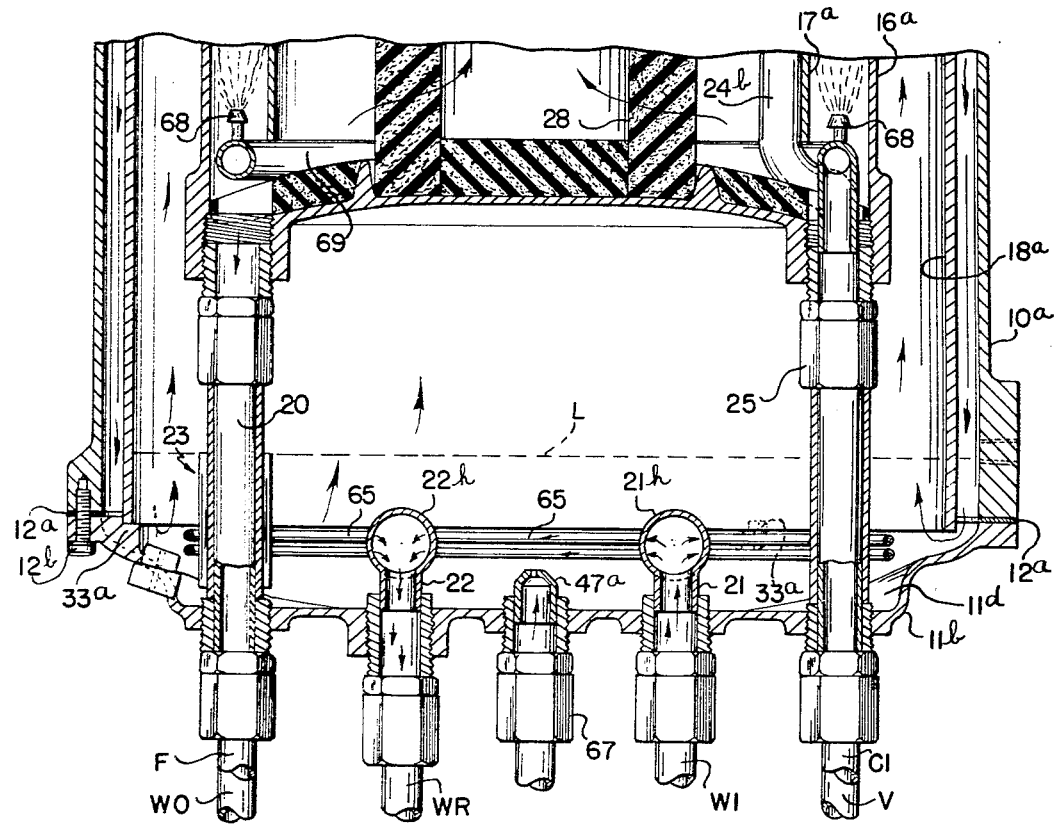
FIG. 7 is a fragmentary view of another modification.

Fragmentary FIG. 7 indicates the possibility of incorporating a heat exchanger within the conservation unit U itself or of using direct contact spray condenser means, or both.

A heat transfer coil or parallel coils or tubes 65 located in the bottom region of the unit below the operating water level are connected to the inlet and outlet headers 21h, 22h as the internal heat exchanger joined to couplings 21 and 22, e.g., externally connected to the engine coolant discharge line and heat exchanger coolant inlet line respectively, if desired in the manner of heat exchanger 52 in FIG. 6; the central coupling 67 used for a make-up water connection to nozzle 47a, and an overflow tube 23 appropriately mounted In this case, the metering valve 55 in FIG. 6 could return make-up water to 67–47a with or without dispersing or spray action, entailing, of course, some loss of efficiency or production rate, since bubbling air distillation is primarily relied upon to effect the vapor transfer of moisture.

Moreover, FIG. 7 shows another modification useable in the units of FIGS. 1 and 5 by omitting coil 15 and using a direct contact condenser means in the form of spray nozzles 68 on a circular manifold 69 connected at 25 as cooling water conduit means to the cooling water inlet or supply line previously described. The nozzles 68 are located and aimed to spray cool fresh water into the annular condenser space, the nozzles shown aimed upwardly counter-currently to the downward moisture laden air stream. Here the overflow 23 occupies the location of the previous condenser water outlet. The potable water outlet here may serve also as part of the overall cooling water conduit means for the intake and discharge of fresh condenser cooling water, the fresh water discharging from the unit at 20 and F being, for example, pump-recirculated through an external ambient sea water cooled heat exchanger and returned as the cool condenser water to the sprays; preferably a fresh water storage tank being on the external recirculation line to take up the fresh water being produced.

The embodiments of the invention in which an exclusive property or privilege is claimed are defined as follows:

1. A converter unit adapted for use in a salt water to potable water conversion system aboard an internal combustion engine powered watercraft operated in salt water comprising:
    a closed vessel forming a unit housing and including side, top and bottom wall portions in sealed relation; partition means including
        a circumferentially continuous first part supported between the top and bottom of the vessel in peripherally spaced relation to side wall portions of the vessel to define a perimetric air flow space from the top region to the bottom region of the vessel and, along the bottom edge of the first part, means providing an inward air flow passage from said space into the interior of the the first part, and
        a second part depending coaxially with and internally of the first part,
    a potable water receptacle having a potable water outlet sealed to and opening outwardly of said vessel, said receptable supported by said partition means,
        said receptacle including a side wall portion coaxially arranged between the said two parts of the partition means and a bottom wall spanning the said second part,
    said receptacle and second part defining an annular condenser space,
    said partition means, receptacle and vessel bottom defining an evaporation chamber with top region communicating with one end of said condenser space,
    condenser means supported in said annular condenser space and having condenser cooling water conduit means extending through and in sealed relation with said vessel,
    a feed water inlet connection sealed to said vessel terminating within and discharging feed water into said evaporation chamber,
    sal water outlet connection means sealed to said vessel and opening to said evaporation chamber adapted to retain therein at least a minimum operating level of salt water above the said inward air flow passage,
    a motor-air pump unit within the vessel having a pump inlet communicating with the other end of said condenser space and a pump outlet discharging to said perimetric air flow space to circulate a stream of air through said air flow space, air flow passage, evaporation chamber and condenser space and back to the air flow space; and vent means sealed to said vessel and opening externally of the vessel to the atmosphere.

2. A unit as described in claim 1, including a heat exchanger internal of the unit comprising heat exchange tube means located in the bottom of said evaporation chamber below the minimum operating water level and having inlet and discharge connections sealed through the said bottom wall; whereby salt water in said evaporation space may be heated by an engine waste heat transferring fluid circulated therethrough.

3. A unit as described in claim 1, wherein said condenser means comprises water-spray nozzle means for spraying fresh water supplied through said condenser cooling water conduit means into said annular condenser space for direct contact cooling and condensation of water vapor from said air stream, whereby water withdrawn from said potable water outlet may be recirculated at least in part through an external cooler and back to said conduit means as condenser cooling water.

4. A unit as described in claim 1, said condenser means comprising a condenser coil, and said condenser cooling water conduit means comprising cooling water inlet and outlet connections, whereby non-potable water may be used as condenser cooling water.

5. A converter unit adapted for use in a salt water to potable water conversion system aboard an internal combustion engine powered watercraft operated in salt water comprising:
    a closed vessel including a hollow cylindrical body and top and bottom walls, at least one of said walls a removable end closure sealed to said body;
    coaxial partition means within and supported between the top and bottom of the vessel including
        a first cylindrical part in spaced relation to the vessel body to define a circumferential air flow space therebetween from the top region to the bottom region of the vessel, and
        a second cylindrical part depending internally of the first part and having a generally horizontally transverse wall apertured to provide a pump inlet,
    a cylindrical potable water receptacle supported by said partition means coaxially about, and with its bottom spaced below the lower edge of, said second part said receptacle having a potable water outlet sealed to and opening outwardly of said vessel,
        said receptacle and second part defining an annular air flow condenser space therebetween and said partition means, receptacle and vessel bottom defining an evaporation chamber, and an air flow passage from said circuferential air flow space to the bottom of said chamber, a condenser coil supported in said annular condenser space and having inlet and outlet connections extending through and in sealed relation with said vessel, salt water outlet connection means sealed to said vessel and opening into said evaporation chamber adapted to retain therein at least a minimum operating level of salt water above the said air flow passage;

a feed water inlet connection sealed to said vessel terminating in dispersing means within said vessel adapted to spray feed water into said chamber above said level, an electric motor-air blower unit within the vessel above said transverse wall having its blower inlet communicating through the aperture of said transverse wall with said condenser space and its blower outlet discharging to said flow space;

said chamber, passage and spaces defining an air circulation path from blower outlet to blower inlet, and vent means sealed to said vessel opening externally of the vessel to the atmosphere and internally between said condenser space downstream thereof and said air flow passage.

6. A unit as described in claim 5, including mist catching means disposed in a part of said path between said chamber and blower inlet.

7. A unit as described in claim 5, wherein said top wall is a removable end closure and all of said connections, connection means and vent means are sealed to the bottom wall of said vessel by releasable means permitting upward withdrawal from the vessel body of the partition means, receptacle and motor - air blower unit as a subassembly.

8. A unit as described in claim 5, wherein at least said receptacle, and partition means are fabricated of material having low heat conductivity to minimize water vapor condensation at regions other than said annular condenser space.

9. A unit as described in claim 5, wherein a said end closure provides the bottom wall of said vessel, and respective external coupling fittings secured in corresponding apertures through said closure afford points for attachment of external piping to said connections, potable water outlet, connection means, and vent means;

said vent means, portable water outlet and coil connections including vertical tubes sealed through said receptacle with bottom ends terminating in respective said coupling fittings;

said partition means, coil, receptacle, vent means, portable water outlet, connections, connection means and electric motor-air blower unit comprising an assembly on said end closure, accessible merely upon separation of said cylindrical body and end closure.

10. A converter unit adapted for use in a salt water to potable water conversion system aboard an internal combustion engine powered watercraft operated in salt water comprising:

a closed water-tight vessel forming a housing for said unit and including a body with side, top and bottom wall portions; partition means within the vessel including horizontally extended transverse wall portions and circumferentially continuous vertical wall portions in generally concentric relation to each other and to side wall portions of the vessel to define a spray chamber, a condenser chamber, an air pump chamber, and a potable water receptacle concentrically arranged in the vessel, and to define a closed air flow path within the vessel from the top region of the spray chamber through said condenser chamber and receptacle, to said pump chamber, and from the pump chamber back to the bottom region of and through said spray chamber;

a feed water inlet connection sealed to said vessel terminating in dispersing means within said vessel adapted to disperse feed salt water as a spray chamber;

salt water outlet connection means sealed to said vessel and opening to said spray chamber and including a salt water overflow limiting the operating level of sprayed-in salt water retained in said vessel;

an electric motor-air pump unit within the said pump chamber in the vessel having a pump inlet communicating with said condenser chamber and a pump outlet discharging to said spray chamber bottom region under a circumferentially substantially continuous vertical wall portion of said partition means;

said potable water receptacle having a potable water outlet sealed to and opening outwardly of said vessel;

a condenser coil supported in said condenser chamber and having inlet and outlet connections extending through and in sealed relation with said vessel;

said condenser chamber having condensate-draining communication into said receptacle;

vent means sealed to said vessel opening externally of the vessel to the atmosphere and internally between said condenser chamber downstream thereof and said spray chamber.

11. A salt water to potable water conversion system adapted for use on internal combustion engine powered watercraft operated in salt waters, including the combination of:

heat exchange means for absorbing waste heat from said engine and therewith heating a stream of salt water as a feed stream; means for introducing to said stream make-up water taken from salt water ambient to the watercraft;

cooling water supply means for delivering ambient salt water to the hereinafter described unit, and a conversion unit for producing potable water from the heated feed stream, said unit comprising:

a closed vessel forming a unit housing, partition means concentrically arranged within the vessel defining therewith a spray chamber and further defining a condensing chamber and an air flow path within the vessel from the spray chamber to the condensing chamber and from the condensing chamber back to the spray chamber, feed stream inlet means including a conduit externally connected to said heat exchange means and a device within the unit for dispersing said feed stream as a spray into the upper space of said spray chamber, salt water outlet means from said vessel disposed in and adapted to maintain in the lower part of the spray chamber a body of sprayed-in heated salt water at a normal operating level range, continuously operable air pump means disposed in the vessel in said air path between the condensing chamber downstream thereof and said spray chamber for circulating air in said vessel as an air stream continuously moving in said air flow path, said air flow path adapted to deliver air back to said spray chamber by bubbling up through said body of heated salt water, indirectly water cooled condenser means in said condensing chamber for condensing water vapor from said air stream and having external connections to said cooling water supply means and to cooling water discharge means, and means within the vessel including a potable water outlet opening externally of said unit for receiving water condensed in said condensing chamber, said heat exchange means comprising a feed stream heater interposed in an engine coolant discharge line to an engine heat exchanger cooling the coolant for return to the engine, a thermostat operated valve interposed in the coolant discharge line between the feed stream heater and the engine heat exchanger adapted normally to direct all the coolant back to the engine by-passing the engine heat exchanger when the engine coolant is kept sufficiently cool for engine requirements by operation of said unit, and thermostatically operating above a limited temperature of coolant therein to divert at least some coolant through the coolant discharge line to the engine heat exchanger.

No references cited.

NORMAN YUDKOFF, *Primary Examiner.*

J. SOFER, *Assistant Examiner.*